United States Patent [19]
Guliani

[11] Patent Number: 5,373,508
[45] Date of Patent: Dec. 13, 1994

[54] DETECTING VALID DATA FROM A TWISTED PAIR MEDIUM

[75] Inventor: Sandeep K. Guliani, Folsom, Calif.

[73] Assignee: Intel Corporation, Santa Clara, Calif.

[21] Appl. No.: 923,853

[22] Filed: Jul. 31, 1992

[51] Int. Cl.$^5$ .............................................. H01S 3/10
[52] U.S. Cl. ..................... 371/20.1; 371/61; 371/68.2; 371/57.2
[58] Field of Search ............... 371/68.2, 57.2, 20.4, 371/21.4, 20.1, 61; 375/10, 25, 36

[56] References Cited

U.S. PATENT DOCUMENTS

| | | | |
|---|---|---|---|
| 4,484,190 | 11/1984 | Bedard . | |
| 5,148,383 | 9/1992 | Jaeger . | |
| 5,164,960 | 11/1992 | Wincn et al. | 375/10 |
| 5,257,287 | 10/1993 | Blumental et al. | 375/19 |
| 5,263,049 | 11/1993 | Wincn et al. | 375/36 |
| 5,276,716 | 1/1994 | Wincn et al. | 375/120 |
| 5,299,230 | 3/1994 | Jaeger et al. | 375/60 |
| 5,315,597 | 5/1994 | Yang et al. | 371/20.1 |
| 5,325,398 | 6/1994 | Murakami et al. . | |

OTHER PUBLICATIONS

Twisted-Pair Medium Attachment Unit and Baseband Medium Type 10BASE-T (Section 14), Local and Metropolitan Area networks, IEEE Standard 802.3i-1990, published by IEEE, New York, N.Y.

*Primary Examiner*—Robert W. Beausoliel, Jr.
*Assistant Examiner*—Albert Decady
*Attorney, Agent, or Firm*—Blakely, Sokoloff, Taylor & Zafman

[57] ABSTRACT

Two parallel valid data detectors are provided to detect whether a sinusoidal electrical signal from a twisted pair medium represents valid data. One handles phase 0 degree starting sinusoidal electrical signal, the other handle phase 180 degree. In either case, the valid data detectors receive two series of pulses as input, indicating positive and negative differences respectively between RD and RD from the twisted pair medium. In response, if the valid data detector detects the proper data pattern within a predetermined time frame, it outputs a signal indicating the detection of valid data. The "phase 0" valid data detector looks for a high to low and back to high data pattern, whereas, the "phase 180" valid data detector looks for a low to high and back to low data pattern. Additionally, a signal magnitude detector is provided to detect magnitude differences between RD+ and RD− from the twisted pair medium, and generate the positive and a negative series of pulses for the valid data detectors, as long as the magnitude differences exceeded a predetermined minimum threshold. Furthermore, a signal synchronizer is provided to receive the valid data detection signal from either valid data detector, and synchronize the generated signal to the internal clock of the receiving circuit.

24 Claims, 11 Drawing Sheets

DETECTING VALID DATA FROM A TWISTED PAIR MEDIUM

BACKGROUND OF THE INVENTION

1. Field of the Invention

The present invention relates to the field of computer system networks, particularly to the Carrier Sense Multiple Access with Collision Detection (CSMA/CD) access method. More specifically, the present invention relates to unshielded twisted pair media and valid data detection.

2. Art Background

In a computer system network, computers and data devices are physically connected to each other via a medium connected to the "medium attachment units" of the computers/data devices. Data are transmitted from one computer/data device to another as electrical signals over the connecting medium. Inherent in electrical signal transmission are noises, jitters, fluctuations in amplitude and frequency, etc. Thus, electrical signals that represent valid data must be differentiated from those that are merely noises or invalid data.

Historically, computer system networks are primarily comprised of homogeneous hardware from the same vendor, or compatible hardware from cooperating vendors that are designed to work with each other. Furthermore, the hardware including most of the connecting media typically operated in "protected" environment. Thus, the problem of differentiating electrical signals representing valid data from those that are not is not particularly difficult. They are solved in a variety of manners, and are well known in the art.

Today, with the availability of a full range of competitively priced hardware from different vendors, computer system networks tend to be comprised of heterogeneous hardware from multi-vendors. Additionally, as affordability continues to widen the application of information processing technology, more and more computer system networks, particularly local area networks in the office environments, are connected with twisted pair media and operated without special environmental supports. At the same time, as state-of-the-art technology continues to increase the operating speed of hardwares, the timing within which the differentiation has to be made has gotten shorter and shorter. Thus, the task of differentiating electrical signals representing valid data from those that are not has become more increasingly difficult.

For example, under the IEEE's Twisted-Pair Medium Attachment Unit and Baseband Medium, Type 10Base-T standard (IEEE Standard 802.3i-1990), it is required that:

1. All continuous signals of amplitude less than 6.2 v peak to peak and frequency lower than 2MHz must be rejected.

2. All sign waves of single cycle duration starting with phase 0 or 180 degrees, of amplitude less than 6.2 v peak to peak, and of frequency between 2 and 15MHz must be rejected if the line is idle 4 bits before and after the sinusoid.

3. All signals with peak magnitude lower than 300 mv must be rejected.

4. A 5MHz or 10MHz data or a combination of both with a +/−13.5 nanoseconds of jitter must be accepted as valid data.

5. The data valid detection signal must be synchronized to the internal clock.

6. Valid data must be detected within 400 nanoseconds on the RD+, RD− pair.

7. In case of a regular Manchester encoded packet with 5MHz preamble bits in the beginning, the synchronous valid data signal delay from the beginning of the data packet should not vary by more than 2 bits from packet to packet. The first bit can be 0 or 1 and the very first pulse can be short pulse, i.e. 50 nanoseconds. Also there may or may not be a link pulse (a single sinusold) immediately before the packet.

Thus, it is required to be able to detect valid data from a twist pair medium under the modern computer system network operating environment. In particular, it is required to be able to meet the IEEE standard for detecting valid data from a twist pair medium. As will be disclosed, the present invention provides a method and apparatus for detecting valid data from a twist pair medium which achieves the objects and desired results described above.

SUMMARY OF THE INVENTION

A method and apparatus for detecting valid data from a twist pair medium is disclosed. The method and apparatus of the present invention has particular application to computer system networks, such as local area networks. Under the present invention, two parallel valid data detectors are provided to detect whether a sinusoidal electrical signal from a twisted pair medium represents valid data. One valid data detector handles the case where the sinusoidal electrical signal starts with phase 0 degree, the other valid data detector handles the case where the sinusoidal electrical signal starts with phase 180 degrees, in either case, the valid data detectors receive two series of pulses as input, indicating positive and negative differences respectively between RD+ and RD− from the twisted pair medium. In response, if the valid data detector detects the proper data pattern within a predetermined time frame, it outputs a signal indicating the detection of valid data. The "phase 0" valid data detector looks for a high to low and back to high data pattern, whereas, the "phase 180" valid data detector looks for a low to high and back to low data pattern.

The "phase 0" valid data detector comprises three asynchronous pulse edge detectors, one falling and two rising, and a timing signal generator. The pulse edge detectors are serially connected with the two rising edge detectors successively following the falling edge detector. The falling edge detector is used to detect the falling edge of a positive difference pulse. The first rising edge detector is used to detect the rising edge of a negative difference pulse following the first positive difference pulse. The second rising edge detector is used to detect the rising edge of another positive difference pulse following the negative difference pulse. The timing generator is used to generate a timing signal after a predetermined amount of time has elapsed since the initial falling edge detection.

Similarly, the "phase 180" valid data detector also comprises three pulse edge detectors, one falling and two rising, and a timing signal generator. The pulse edge detectors are serially connected with the two rising edge detectors successively following the falling edge detector. The falling edge detector is used to detect the falling edge of a negative difference pulse. The first rising edge detector is used to detect the rising edge of a positive difference pulse following the first negative difference pulse. The second rising edge detector is used to detect the rising edge of another negative difference pulse following the positive difference pulse. The timing generator is used to generate a timing signal after a predetermined amount of time has elapsed since the initial falling edge detection.

Additionally, a signal magnitude detector is provided to detect magnitude differences between RD+ and RD− from the twisted pair medium, and generate the positive and a negative series of pulses for the valid data detectors, as long as the magnitude differences exceeded a predetermined minimum threshold. Furthermore, a signal synchronizer is provided to receive the valid data detection signal from either valid data detector, and synchronize the generated signal to the internal clock of the receiving circuit.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION PRESENTLY PREFERRED AND ALTERNATE EMBODIMENT

A method and apparatus for detecting valid data from a twist pair medium is disclosed. The method and apparatus of the present invention has particular application to computer system networks, such as local area networks. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
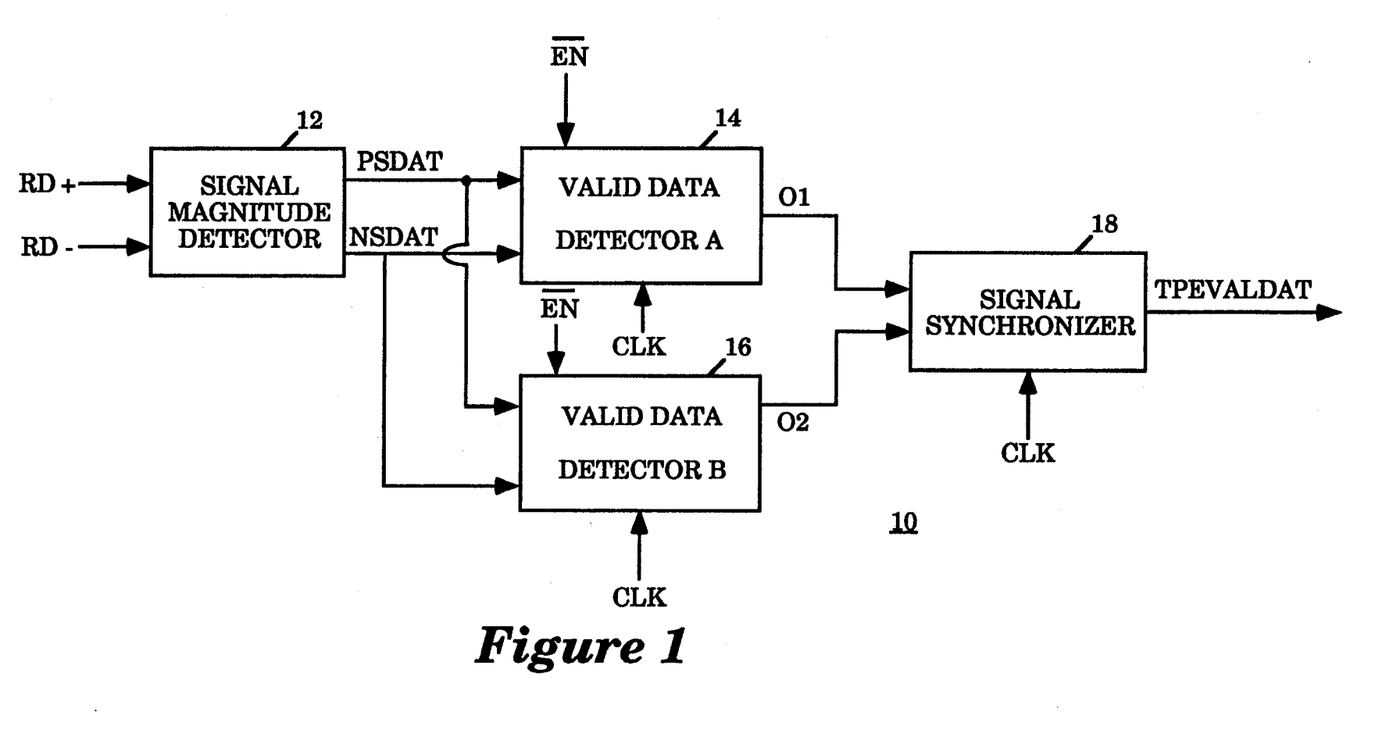
FIG. 1 shows a functional block diagram illustrating the major components of the valid data detector for twisted pair medium of the present invention.

Referring now to FIG. 1, a functional block diagram illustrating the major components of the valid data detector for twist pair medium of the present invention is shown. Shown are two parallel valid data detectors, A and B, 14 and 16, coupled to a signal magnitude detector 12, and a signal synchronizer 18. The signal magnitude detector 12 receives RD+ and RD− from a twist pair medium as input, and outputs a series of positive magnitude difference pulses (PSDAT) and a series of negative magnitude difference pulses (NSDAT) for the two valid data detectors, A and B, 14 and 16.

Figure 2A:
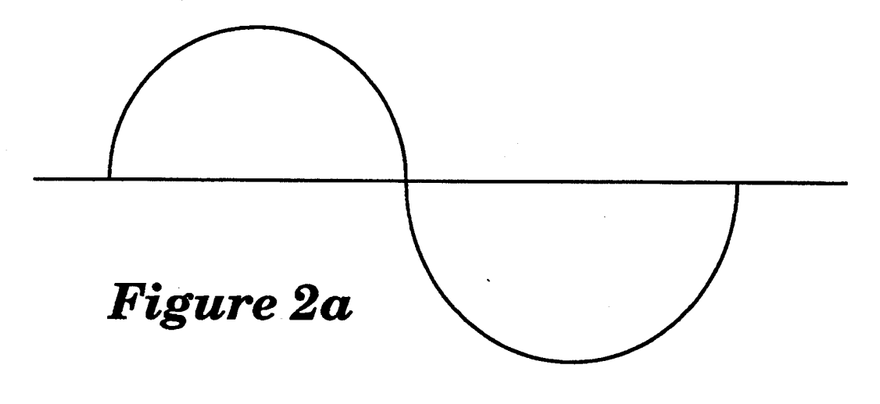
FIGS. 2a–2b show a phase 0 degree and a phase 180 degree starting sinusoidal electrical signal respectively.
Figure 2B:
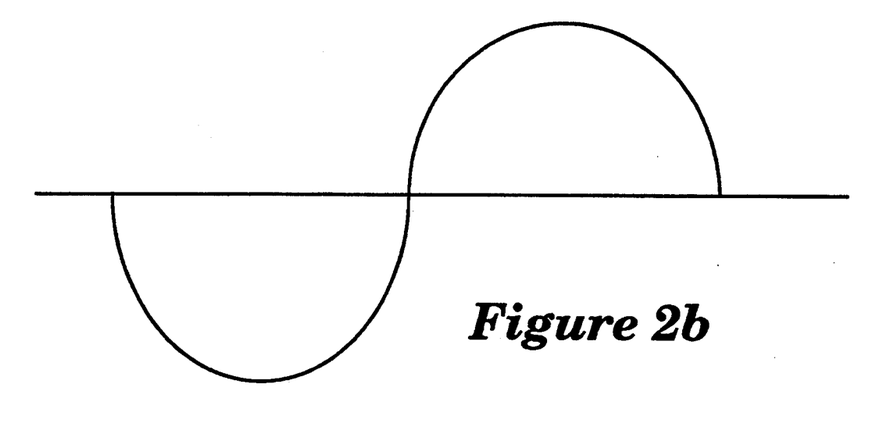

Valid data detectors A and B, 14 and 16, detect valid data for phase 0 degree and phase 180 degree starting sinusoidal electrical signal respectively. A phase 0 degree and a phase 180 degree starting sinusoidal electrical signal is illustrated in FIGS. 2a and 2b respectively. In addition to PSDAT and NSDAT pulses, valid data detectors A and B, 14 and 16, also receive the internal clock of the receiving circuit (not shown), and an inverted enable signal (EN) as input. If either valid data detector A or B, 14 or 16, detects the proper data pattern from the PSDAT and NSDAT pulses, it outputs a valid data detection signal (O1 or O2) for the signal synchronizer 18.

The signal synchronizer 18 synchronizes the valid data detection signal (O1 or O2) to the internal clock of the receiving circuit, and outputs signal TPEVALDAT. In addition to O1 or O2, the signal synchronizer 18 also receives the internal clock of the receiving circuit as input.

Figure 3:
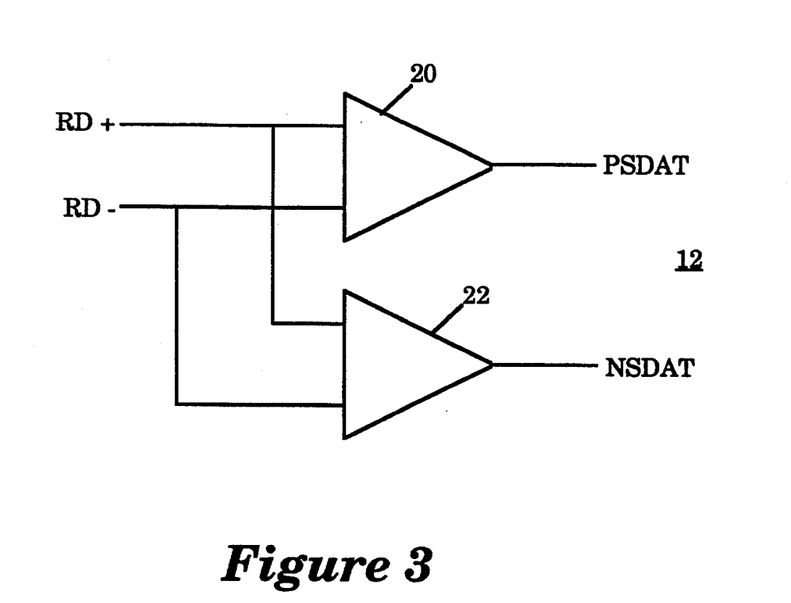
FIG. 3 illustrates one embodiment of the signal magnitude detector of FIG. 1.
Figure 4:
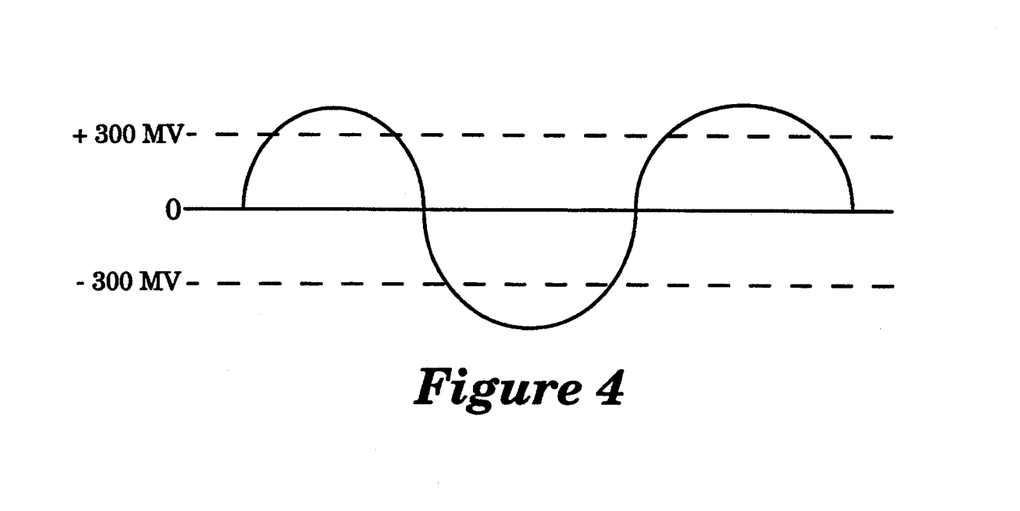
FIG. 4 shows an exemplary sinusoidal electrical signal exceeding an exemplary minimum magnitude threshold of +/−300 mv.

Referring now to FIG. 3, a block diagram illustrating the signal magnitude detector of FIG. 1 is shown. Shown are two differential amplifiers, 20 and 22, receiving RD+ and RD− from a twisted pair medium as input, and in response, outputting the PSDAT and NSDAT pulses if the peak magnitude of the incoming sinusoidal electrical signal exceeds a predetermined minimum threshold. In an embodiment that meets the IEEE 10BASE-T standard, the minimum threshold is +/−300 mv. An exemplary sinusoidal electrical signal with peak magnitude exceeding +/−300 mv is illustrated in FIG. 4.

Figure 5:
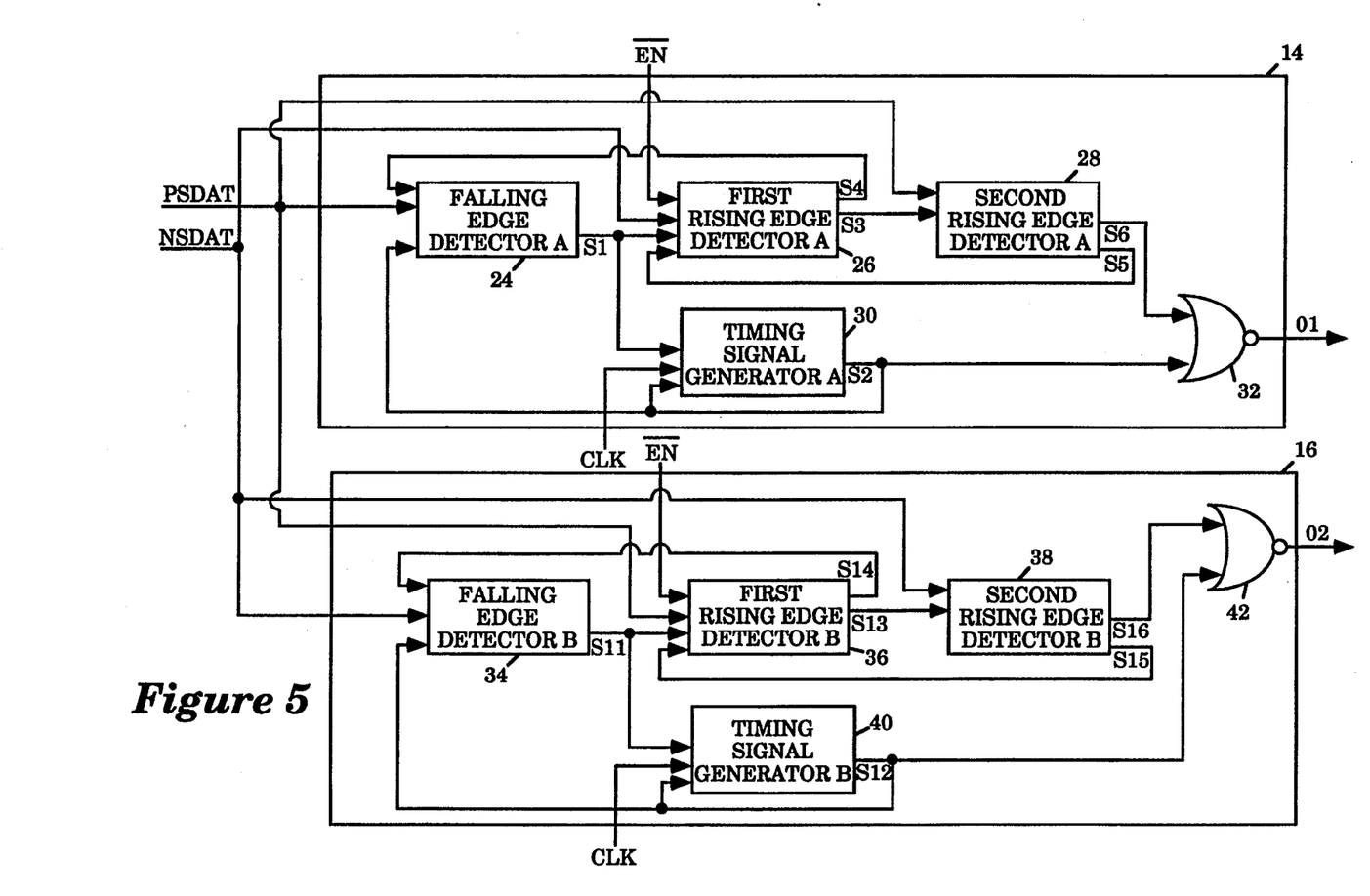
FIG. 5 shows the major subcomponents of the "phase 0" and "phase 1" valid data detector of FIG. 1.

Referring now to FIG. 5, a block diagram illustrating the major subcomponents of the "phase 0" and "phase 180" valid data detectors of FIG. 1 is shown. Each of the valid data detector, 14 or 18, comprises three pulse edge detectors, 24–28, or 34–38, a timing signal generator, 30 or 40, and a NOR gate 32 or 42. The first of the three pulse edge detectors, 24–28, or 34–38, is a falling edge detector, 24 or 34, and the second and third pulse edge detectors, 26–28 or 36–38, are rising edge detectors. The three pulse edge detectors, 24–28, or 34–38, look for a proper data pattern within a predetermined amount of time. The predetermined amount of time is controlled by the timing signal generator, 30 or 40.

In the case of the "phase 0" valid data detector 14, the edge detectors, 24–28, look for a data pattern of from high to low and then back from low to high again (1-0-1) within a predetermined amount of time. The falling edge detector 24 detects the falling edge of a PSDAT pulse. The first rising edge detector 26 detects the rising edge of a NSDAT pulse following the detected PSDAT pulse. The second rising edge detector 28 detects the rising edge of another PSDAT pulse following the detected NSDAT pulse. If the 1-0-1 pattern is detected within a predetermined time frame, the "phase 0" valid data detector 14 outputs a signal (O1) indicating valid data has been detected.

Similarly, in the case of the "phase 180" valid data detector 16, the edge detectors, 34-38, look for a data pattern of from low to high and then back from high to low again (0-1-0) within a predetermined amount of time. The falling edge detector 34 detects the falling edge of a NSDAT pulse. The first rising edge detector 36 detects the rising edge of a PSDAT pulse following the detected NSDAT pulse. The second rising edge detector 38 detects the rising edge of another NSDAT pulse following the detected PSDAT pulse. If the 0-1-0 pattern is detected within a predetermined time frame, the "phase 180" valid data detector 16 outputs a signal (O2) indicating valid data has been detected.

It will be appreciated that by having two parallel valid data detectors, 14 and 16, one looking for the data pattern "1-0-1" and one looking for the data pattern "0-1-0", the sixth and seventh requirements of the IEEE 10Base-T standard described above are met.

Figure 6:
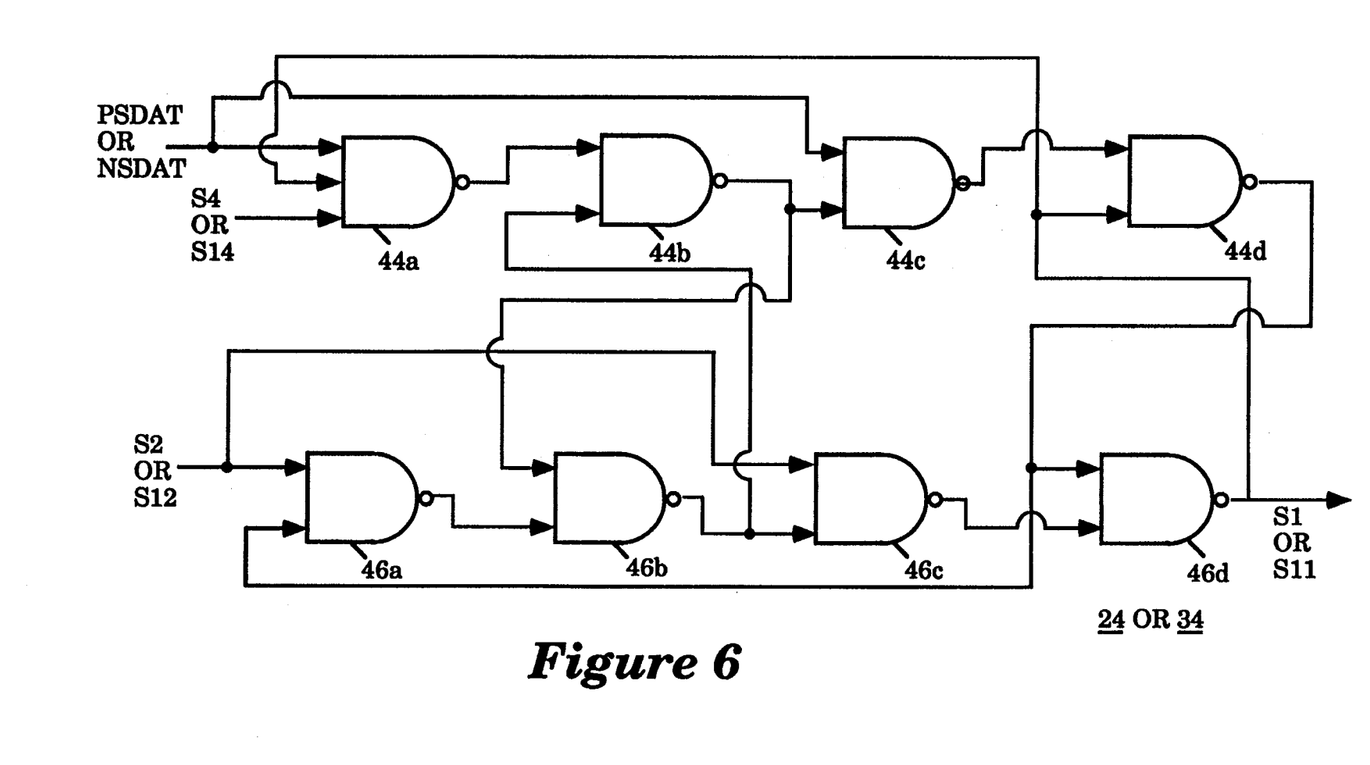
FIG. 6 illustrates the falling edge detector of FIG. 5.
Figure 11:
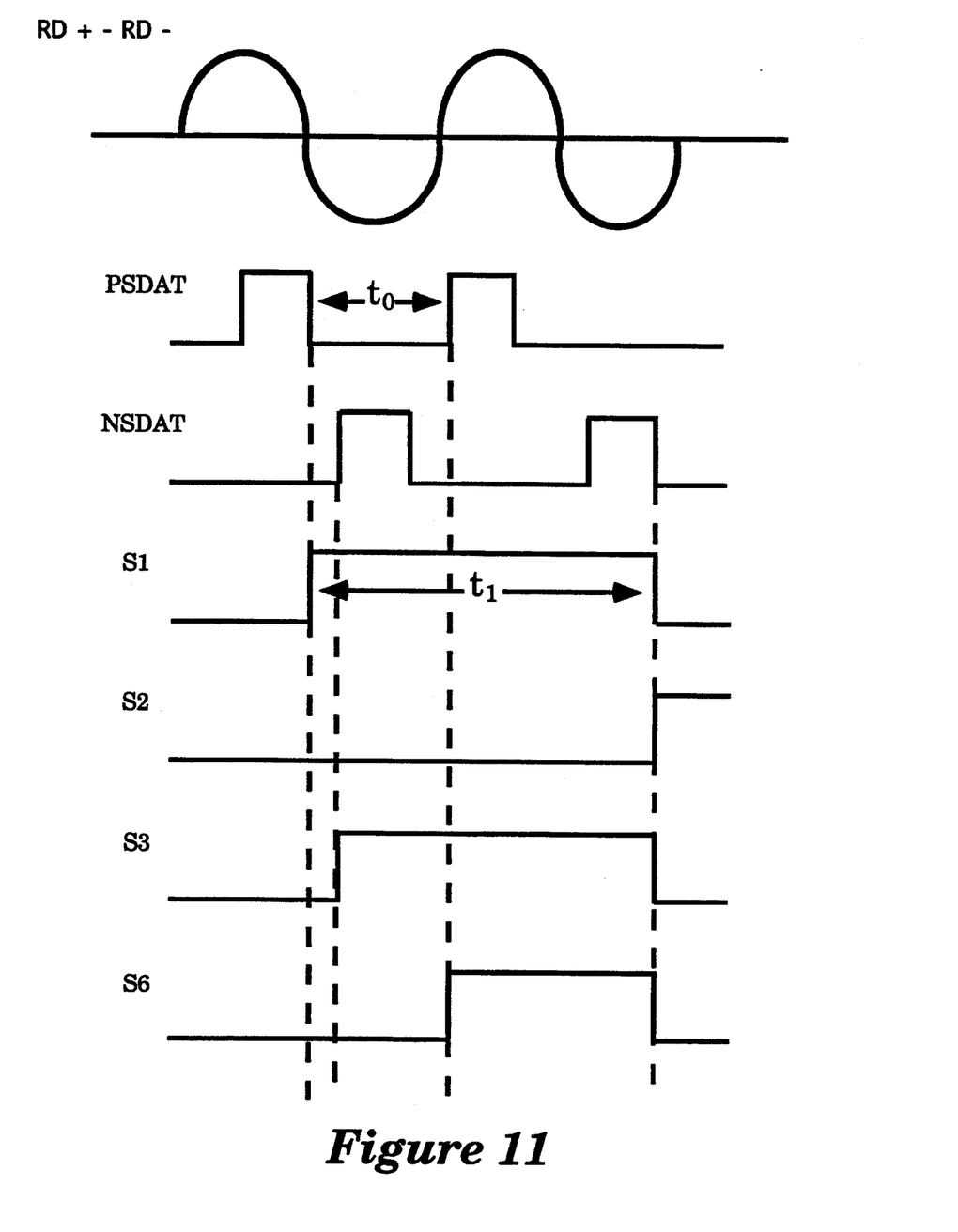
FIG. 11 illustrates the timing relationship of various signals for a phase 0 degree staring sinusoidal electrical signal.
Figure 12:
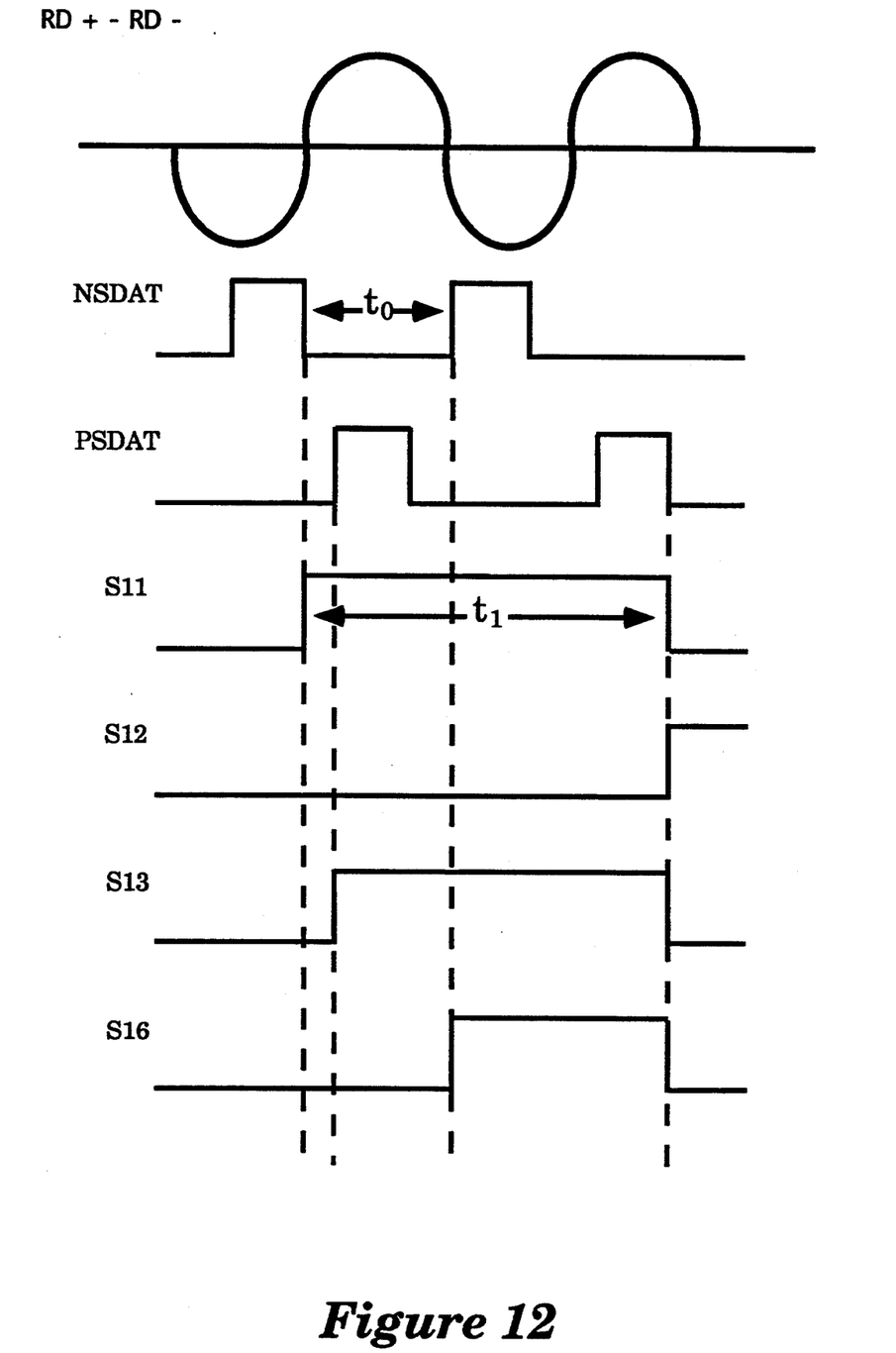
FIG. 12 illustrates the timing relationship of various signals for a phase 180 degree starting sinusoidal electrical signal.

Continuing to refer to FIG. 5, the falling edge detector 24 or 34 receives the PSDAT or NSDAT pulses as input. In addition, it also receives feedback from the first rising edge detector 26 or 36, S4 or S14, and from the timing signal generator 30 or 40, S2 or S12. The falling edge detector 24 or 34 outputs signal S1 or S11 until it receives the feedback signal S2 or S12. Feedback signal S4 or S14 is used to make sure that rising edge detectors 26, 28 or 36, 38 are clear before falling edge detector 24 or 34 starts edge detection. The timing relationship of these signals are illustrated in FIGS. 11-12. FIG. 6 illustrates one embodiment of the failing edge detector 24 or 34. In this embodiment, the falling edge detector 24 or 34 comprises two series of NAND gates 44a-44d and 46a-46d. The NAND gates 44a-44d and 46a-46d are advantageously coupled to produce the desired result.

Figure 7:
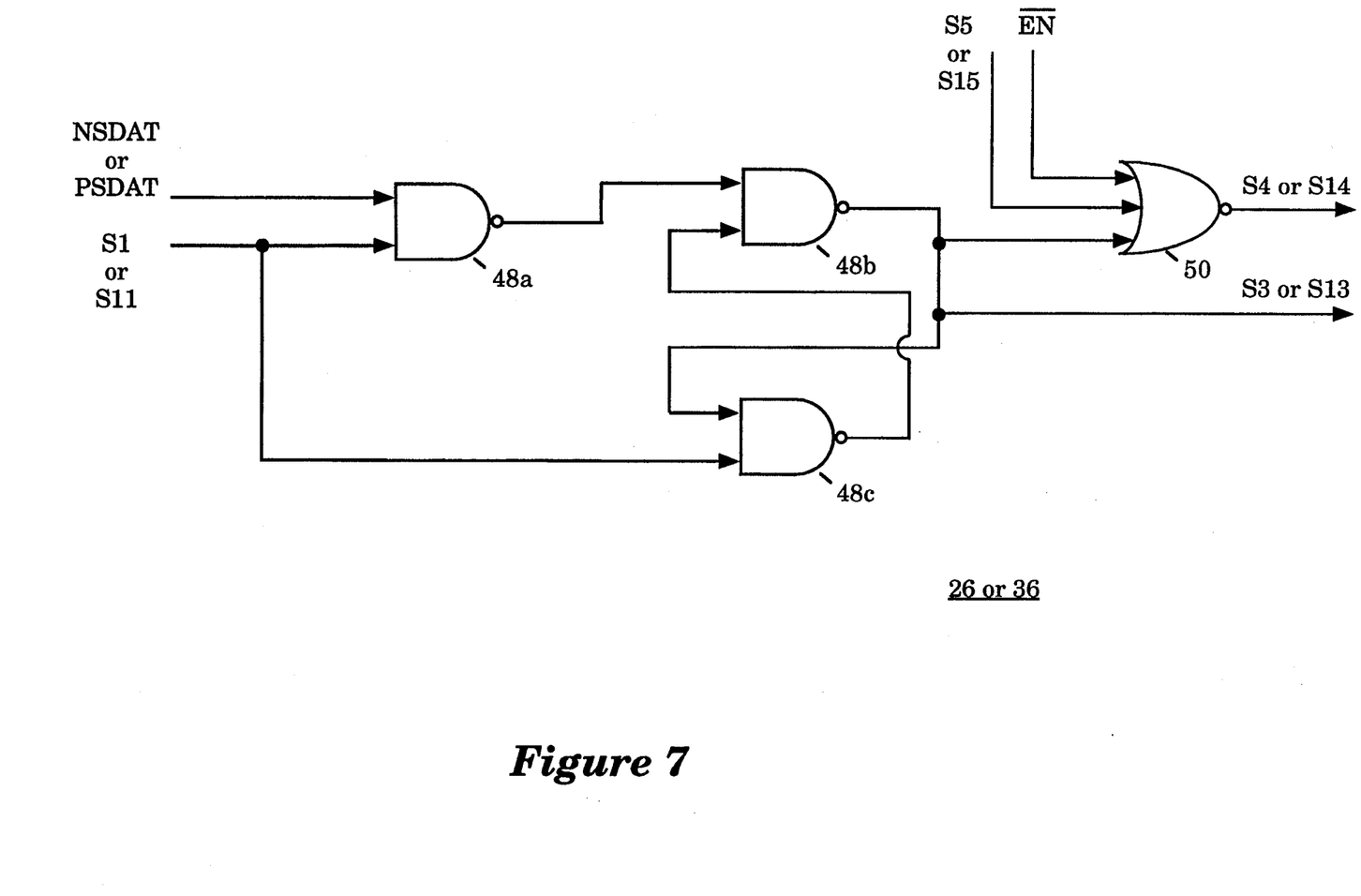
FIG. 7 illustrates the first rising edge detector of FIG. 5.

Referring back to FIG. 5, the first rising edge detector 26 or 36 receives the NSDAT or PSDAT pulses, an inverted enable signal (EN), and S1 or S11 as inputs. In addition, it receives feedback from the second rising edge detector, 28 or 38, S5 or S15, as inputs. The first rising edge detector, 26 or 36, outputs signals S3 or S13, when both NSDAT and S1 or PSDAT and S11, are both "1". The inverted enable signal (EN), and S5 or S15, are used to generate the signal S4 or S14. The timing relationship of these signals are illustrated in FIGS. 11-12. FIG. 7 illustrates one embodiment of the first rising edge detector 26 or 36. In this embodiment, the first rising edge detector 26 or 36 comprises three NAND gates 48a-48c and one NOR gate 50. The NAND gates 48a-48c and the NOR gate 50 are advantageously coupled to produce the desired result.

Figure 8:
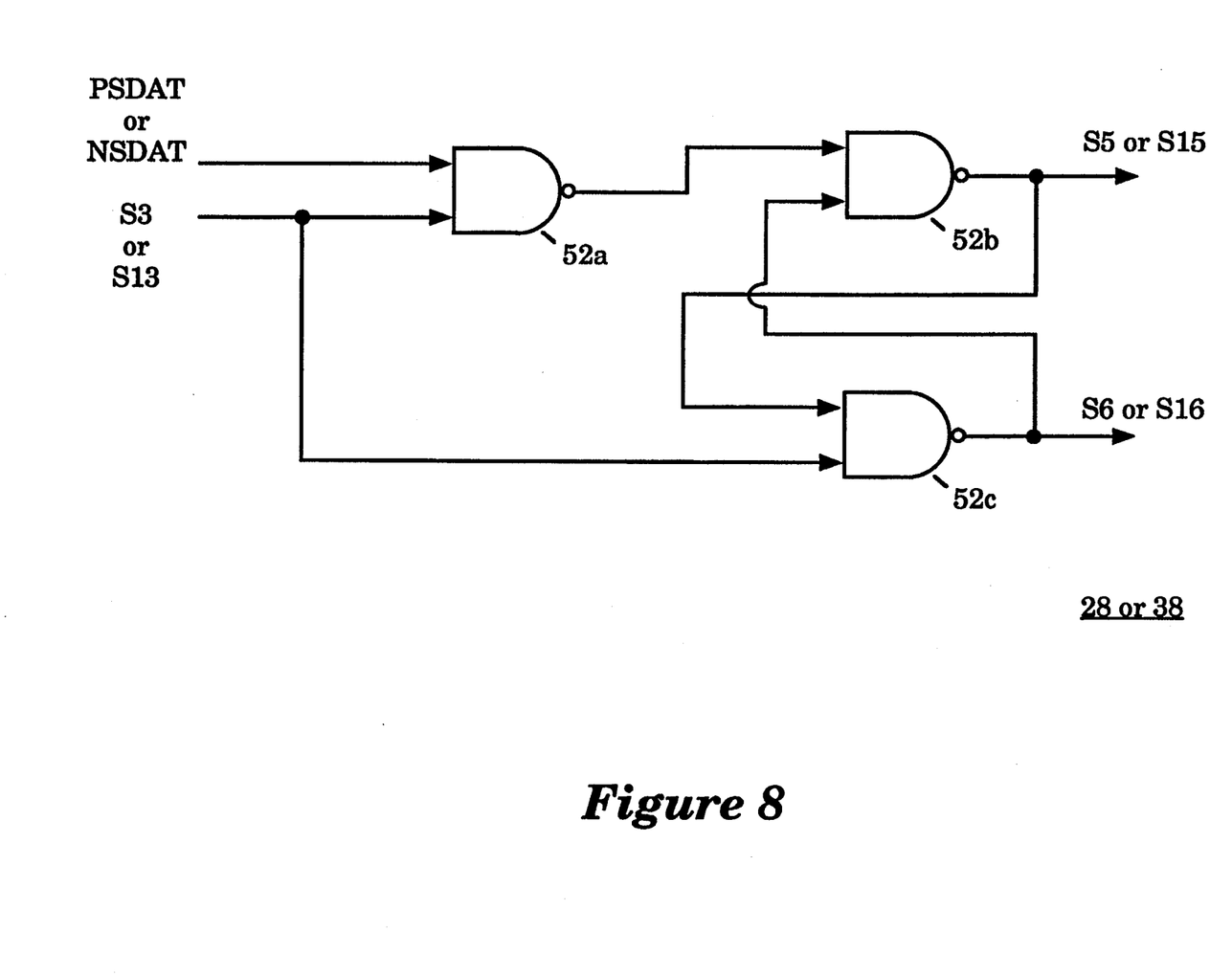
FIG. 8 illustrates the second rising edge detector of FIG. 5.

Referring back to FIG. 5, the second rising edge detector 28 or 38 receives the PSDAT or NSDAT pulses, and S3 or S13 as inputs. The second rising edge detector, 28 or 38, outputs signals S5 and S6, or S15 and S16, when both PSDAT and S3 or NSDAT and S13 are high. The timing relationship of these signals are illustrated in FIGS. 11—12. It will be appreciated that the timing of the signals are advantageously coordinated such that as the time between two successive PSDAT or NSDAT pulses ($t_0$) increases, the time output signal S6 goes high will shift to right. As to increases beyond $t_1$, which is fixed and predetermined, S6 will not go high resulting in no valid data detection signal. FIG. 8 illustrates one embodiment of the second rising edge detector 28 or 38. In this embodiment, the second rising edge detector 28 or 38 comprises three NAND gates 52a-52c. The NAND gates 52a-52c are advantageously coupled to produce the desired result.

Figure 9:
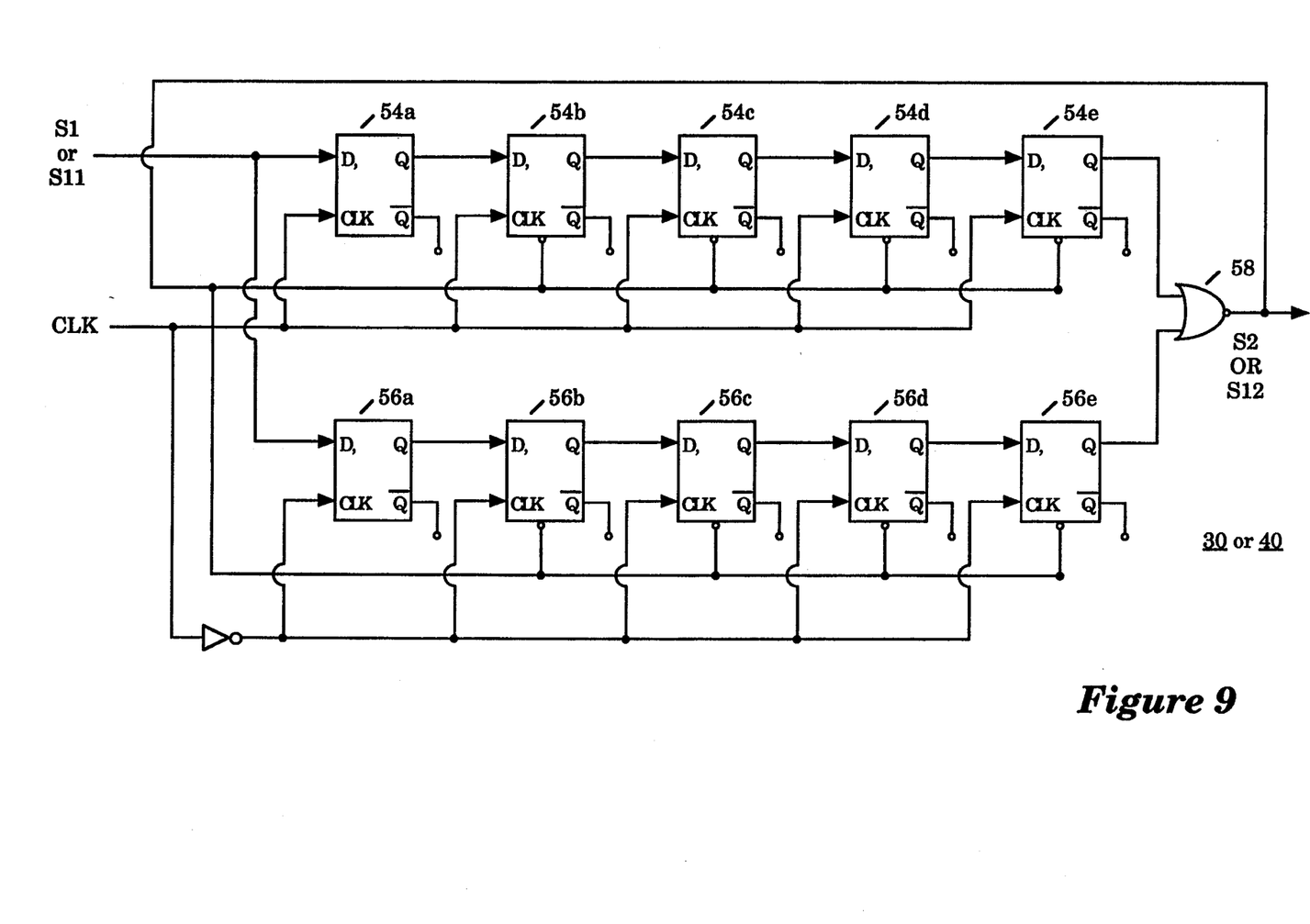
FIG. 9 illustrates one embodiment of the timing signal generator of FIG. 5.

Referring back to FIG. 5, the timing signal generator 30 or 40 receives S1 or S11, and clock pulses as inputs. In addition, it receives feedback from itself, S2 or S12. The timing signal generator 30 or 40 outputs signal S2 or S12 after receiving S1 or S11 as input and waiting a predetermined amount of time. FIG. 9 illustrates one embodiment of the timing signal generator 30 or 40. In this embodiment, the timing signal generator 30 or 40 comprises two series of master slave flip flops 54a-54e and 56a-56e, and a NOR gate 58. The flip flops 54a-54e and 56a-56e and the NOR gate 58 are advantageously coupled together to achieve the desired timing delay for output signal S2 or S12. More specifically, in this embodiment, the flip flops 54-54e and 56a-56e provide 200-225 nanoseconds of delay. It will be appreciated that by requiring the "phase 0" and "phase 180" valid data detectors to detect the "1-0-1" and the "0-1-0" pattern within 200-225 nanoseconds, the first, second, and fourth requirement of the IEEE 10Base-T standard described earlier are met.

Referring back to FIG. 5 again, the NOR gate 32 or 42 receives S2 and S6 or S12 and S16 as inputs. The NOR gate 31 or 42 outputs the signal O1 or O2, when it receives S6 or S16, and it continues to output signal O1 or O2 until it receives S2 or S12 as input.

Figure 10:
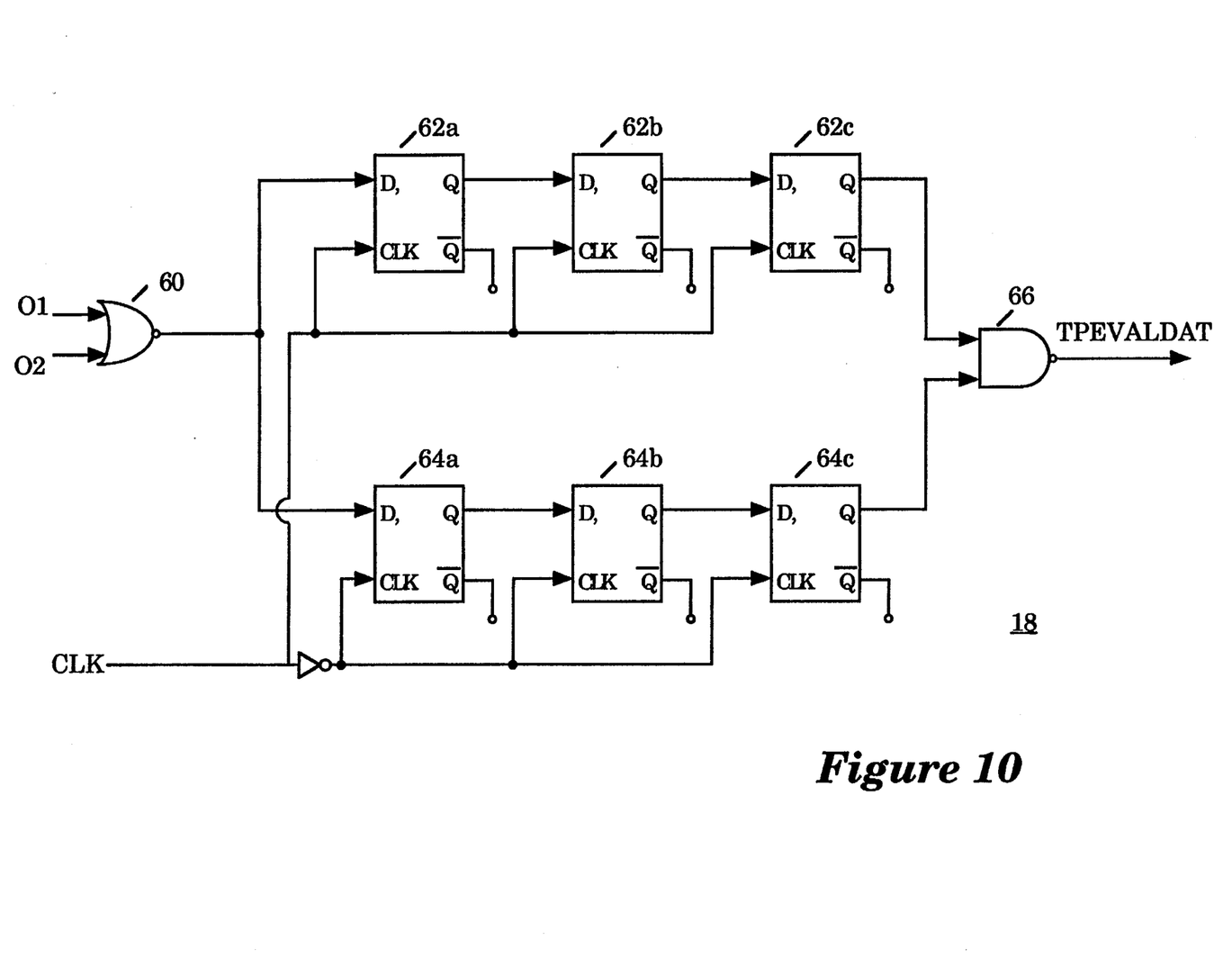
FIG. 10 illustrates one embodiment of the signal synchronizer of FIG. 1.

Referring now to FIG. 10, a block diagram illustrating one embodiment of the signal synchronizer of FIG. 1 is shown. In this embodiment, the signal synchronizer 18 comprises a NOR gate 60, two series of master slave flip flops, 62a-62c and 64a-64c, and a NAND gate 66. These elements are advantageously coupled together to synchronize asynchronous signal O1 or O2 to the internal clock of the receiving circuit, providing the desired resolution time. More specifically, in this embodiment, 100 nanoseconds of resolution time is provided.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a data device of a computer system network, wherein said data device is equipped to be coupled to a twisted pair medium for receiving data being transported over said twisted pair medium, an apparatus for detecting valid data received over said twisted pair medium, said apparatus comprising:

a) pulse generation circuitry to be coupled to said twisted pair medium for generating a first and a second series of pulses based on positive and negative magnitude differences of a sinusoidal electrical signal representing said transported data received from a positive and a negative lead of said twisted pair medium;

b) first valid data detector circuitry, including first timing and first edge detection circuitry, coupled to said pulse generation circuitry for detecting a first signal pattern, including a first rising edge of said second series of pulses preceded and followed by a first falling and a first rising edge of said first series of pulses respectively, within a first predetermined amount of time, for a phase 0 degree starting sinusoidal electrical signal, and generating a first output signal upon detecting said first data pattern;

c) second valid data detector circuitry, including second timing and second edge detection circuitry, coupled to said pulse generation circuitry for detecting a second signal pattern, including a second rising edge of said first series of pulses preceded and followed by a first falling and a second rising edge of said second series of pulses respectively, within a second predetermined amount of time, for a phase 180 degree starting sinusoidal electrical signal, and generating a second output signal upon detecting said second data pattern; and d) signal synchronization circuitry coupled to said first and second valid data detector circuitry for outputting a selected one of said first and second output signals.

2. The apparatus as set forth in claim 1, wherein, said first valid data detector circuitry comprises:

b.1) falling edge detector circuitry coupled to said pulse generation circuitry for outputting a first detection signal denoting detection of said first falling edge of said first series of pulses using said first series of pulses, a first feedback signal; and a timing signal;

b.2) first rising edge detector circuitry coupled to said falling edge detector circuitry for outputting a second detection signal denoting detection of said first rising edge of said second series of pulses, and providing said first feedback signal to said falling edge detector circuitry, using said second series of pulses and a second feedback signal;

b.3) second rising edge detector circuitry coupled to said first rising edge detector circuitry for outputting a third detection signal denoting detection of said first rising edge of said first series of pulses, and providing said second feedback signal to said first rising edge detector, using said first series of pulses and said second detection signal;

b.4) timing signal generator circuitry coupled to said falling edge detector circuitry for outputting said timing signal after said falling edge detector circuitry detecting said first falling edge of said first series of pulses and waiting a predetermined amount of time, using said first detection signal, an input clock signal, and said timing signal; and b.5) a NOR gate coupled to said second rising edge detector circuitry and said timing signal generator circuitry for outputting said first output signal using said third detection signal and said timing signal.

3. The apparatus as set forth in claim 2, wherein, said timing signal generator circuitry comprises a first and a second plurality of FIFOs parallel to each other and coupled to said falling edge detector circuitry, and a NOR gate coupled to said FIFOs for cooperatively outputting said timing signal, using said first detection signal, said input clock signal, and said timing signal.

4. The apparatus as set forth in claim 3, wherein, each of said first and second plurality of FIFOs provides 200–225 nanoseconds of timing delays.

5. The apparatus as set forth in claim 2, wherein, said first rising detector circuitry comprises a plurality of NAND gates coupled to said pulse generation circuitry and said falling edge detector, and a NOR gate coupled to said NAND gates and said second rising edge detector for cooperatively outputting said second detection signal and said first feedback signal, using said second series of pulses, said first detection signal, and said second feedback signal.

6. The apparatus as set forth in claim 2, wherein, said second rising edge detector circuitry comprises a plurality of NAND gates coupled to said pulse generation circuitry, said first rising edge detector circuitry for cooperatively outputting said third detection signal and said second feedback signal, using said first series of pulses and said second detection signal.

7. The apparatus as set forth in claim 1, wherein, said pulse generation circuitry comprises a first and a second differential amplifiers for outputting said first and second series of pulses respectively if signal magnitude peaks of said sinusoidal electrical signal exceed a first and a second minimum threshold.

8. The apparatus as set forth in claim 1, wherein, said first and second minimum thresholds are $+/-300$ mv.

9. The apparatus as set forth in claim 1, wherein, said first and second valid data detection circuitry are similarly constituted.

10. The apparatus as set forth in claim 2, wherein, said falling edge detector circuitry comprises a plurality of NAND gates to said pulse generation circuitry, said first rising edge detector, and said timing signal generator for cooperatively outputting said first detection signal using said first series of pulses said first feedback signal, and said timing signal.

11. The apparatus as set forth in claim 1, wherein, said signal synchronizer circuitry comprises a NOR gate coupled to said first and second valid data detector, a first and a second plurality of FIFOs parallel to each other and coupled to said NOB gate, and a NAND gate coupled to said first and second plurality of FIFOs for cooperatively outputting said selected one of said first and second output signals, using said first and second output signals and an input clock signal.

12. The apparatus as set forth in claim 11, wherein, each of said first and second plurality Of FIFOs provides 100–125 nanoseconds of timing delays.

13. In a data device of a computer system network, wherein said data device is equipped to be coupled to a twisted pair medium for receiving data being transported over said, twisted pair medium, a method for detecting valid data received over said twisted pair medium, said method comprising the steps of:

a) generating a first and a second series of pulses based on positive and negative magnitude differences of a sinusoidal electrical signal representing said transported data received from a positive and a negative lead of said twisted pair medium;

b) detecting a first data pattern, including a first rising edge of said second series of pulses preceded and followed by a first falling and a first rising edge of said first series of pulses respectively, within a predetermined amount of time, for a phase 0 degree starting sinusoidal electrical signal, and generating a first output signal upon detecting said first data pattern;

c) detecting a second data pattern, including a second rising edge of said first series of pulses preceded and followed by a first falling and a second rising edge of said second series of pulses respectively, within a predetermined amount of time, for a phase 180 degree starting sinusoidal electrical signal, and generating a second output signal upon detecting said second data pattern; and d) outputting a selected one of said first and second output signals.

14. The method as set forth in claim 13, wherein, said step b) comprises the steps of:
- b.1) outputting a first detection signal denoting detection of said first falling edge of said first series of pulses, using said first series of pulses, a first feedback signal, and a timing signal;
- b.2) outputting a second detection signal denoting detection of said first rising edge of said second series of pulses, and outputting said first feedback signal, using said second series of pulses, said first detection signal, and a second feedback signal;
- b.3) outputting a third detection signal denoting detection of said first rising edge of said first series of pulses, and outputting said second feedback signal, using said first series of pulses and said second detection signal;
- b.4) outputting said timing signal after detecting said first falling edge of said first series of pulses and waiting a predetermined amount of time, using said first detection signal, said input clock signal, and said timing signal; and
- b.5) outputting said first output signal using said third detection signal and said timing signal.

15. The method as set forth in claim 14, wherein, said timing signal is output in said step (b.4) by applying in parallel a first and a second predetermined amount of delay and performing a NOR operation, using said first detection signal, said input clock signal, and said timing signal.

16. The method as set forth in claim 15, wherein, each of said first and second predetermined amount of delays is 200–225 nanoseconds.

17. The method as set forth in claim 14, wherein, said first detection signal denoting detection of said first falling edge of said first series of pulses is outputting said step (b.1) by performing a plurality of NAND operations using said first series of pulses, said first feedback signal, and said timing signal.

18. The method as set forth in claim 14, wherein, said second detection signal denoting detection of said first rising edge of said second series of pulses and said first feedback signal are output in said step (b.2) by performing a plurality of NAND operations and a NOR operation, using said second series of pulses, said first and second detection signals.

19. The method as set forth in claim 14, wherein, said third detection signal denoting detection of said first rising edge of a second pulse of said first series of pulses and said second feedback signal are output in said step (b.3) by performing a plurality of NAND operations using said first series of pulses and said second detection signal.

20. The method as set forth in claim 14, wherein, said selected one of said first and second output signals is output in said step (b.5) by performing a NOR operation, applying in parallel a first and a second predetermined amount of delay, and performing a NAND operation, using said first and second output signals, and said input clock signal.

21. The method as set forth in claim 20, wherein, each of said first and second predetermined amount of delays is 100–125 nanoseconds.

22. The method as set forth in claim 13, wherein, said first and second series of pulses are generated if signal magnitude peaks of said sinusoidal electrical signal exceed a first and a second minimum threshold.

23. The method as set forth in claim 22, wherein, said second minimum thresholds are $+/-300$ mv.

24. The method as set forth in claim 13, wherein, said first and second valid data patterns are detected in similar manner.

* * * * *

UNITED STATES PATENT AND TRADEMARK OFFICE
CERTIFICATE OF CORRECTION

PATENT NO. : 5,373,508
DATED : December 13, 1994
INVENTOR(S) : Sandeep K. Guliani It is certified that error appears in the above-identified patent and that said Letters Patent is hereby corrected as shown below:

In column 2 at line 11 delete "(a single sinusold)" and insert --(a single sinusoid)--

In column 2 at line 35 delete "degrees, in" and insert --degrees. In--

In column 5 at line 63 delete "to" and insert --$t_0$-- (second occurrence)

In column 8 at line 16 delete "claim 1," and insert --claim 7,--

In column 8 at line 32 delete "NOB" and insert --NOR--

In column 10 at lines 31-32 insert --first and-- following "said" and prior to "second"

Signed and Sealed this

Fourteenth Day of January, 1997

Attest:

BRUCE LEHMAN

Attesting Officer

Commissioner of Patents and Trademarks